United States Patent
Steiger et al.

(10) Patent No.: US 7,273,919 B1
(45) Date of Patent: Sep. 25, 2007

(54) HIGH HEAT POLYETHERSULFONE COMPOSITIONS

(75) Inventors: Daniel Steiger, Clifton Park, NY (US); Farid Fouad Khouri, Clifton Park, NY (US); Daniel Joseph Brunelle, Burnt Hills, NY (US); Amy Beth Koren, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 148 days.

(21) Appl. No.: 11/286,181

(22) Filed: Nov. 21, 2005

(51) Int. Cl.
*C08G 75/00* (2006.01)
*C08G 61/02* (2006.01)
*C08G 65/38* (2006.01)
*C08G 65/40* (2006.01)

(52) U.S. Cl. .................. 528/373; 528/391; 528/86; 528/210; 528/171; 528/172; 528/174; 528/175; 528/211; 528/219

(58) Field of Classification Search ............... 528/391, 528/373, 210, 211, 171–175, 86, 219
See application file for complete search history.

(56) References Cited

U.S. PATENT DOCUMENTS

| | | | |
|---|---|---|---|
| 3,647,751 A | 3/1972 | Darsow et al. | |
| 4,010,147 A | 3/1977 | Rose | |
| 4,108,837 A | 8/1978 | Johnson et al. | |
| 4,175,175 A | 11/1979 | Johnson et al. | |
| 4,273,712 A | 6/1981 | Williams, III | |
| 4,460,778 A | 7/1984 | Brunelle | |
| 4,513,141 A | 4/1985 | Brunelle et al. | |
| 4,554,357 A | 11/1985 | Verbicky, Jr. et al. | |
| 4,681,949 A | 7/1987 | Brunelle | |
| 4,785,072 A | 11/1988 | Harris et al. | |
| 4,818,803 A | 4/1989 | Harris | |
| 5,081,298 A | 1/1992 | Brunelle | |
| 5,116,975 A | 5/1992 | Brunelle | |
| 5,132,423 A | 7/1992 | Brunelle et al. | |
| 5,198,525 A * | 3/1993 | Reuter et al. ............... 528/171 |
| 5,344,910 A * | 9/1994 | Sybert ........................ 528/201 |
| 5,455,310 A * | 10/1995 | Hoover et al. ............... 525/431 |
| 6,228,970 B1 | 5/2001 | Savariar | |
| 2005/0113558 A1 | 5/2005 | Johnson et al. | |
| 2006/0069236 A1* | 3/2006 | Brunelle et al. ............ 528/373 |

FOREIGN PATENT DOCUMENTS

| | | |
|---|---|---|
| DE | 1932067 | 1/1971 |
| GB | 1078234 | 8/1967 |
| GB | 1264900 | 2/1972 |
| WO | WO86/04906 | 8/1986 |

OTHER PUBLICATIONS

STIC search pp. 133-135, abstract and monomers of Doklady Akademil Nauk SSSR (1973), 208(2), 360-361.*
Co-pending entitled "Phosphazenium Salt Phase Transfer Catalysts", U.S. Appl. No. 10/950,874, filed Sep. 24, 2004, GE Docket No. 147906-1.
Co-pending entitled " Polyethersulfone Compositions With high heat and Good Impact Resistance", U.S. Appl. No. 10/951,299, filed Sep. 27, 2004, GE Docket No. 155804-1.

* cited by examiner

Primary Examiner—Randy Gulakowski
Assistant Examiner—A. Toscano
(74) Attorney, Agent, or Firm—Andrew J. Caruso; William E. Powell

(57) ABSTRACT

High heat polyethersulfone compositions are provided which possess unexpectedly high glass transition temperatures. The polyethersulfone compositions comprise structural units derived from phthalimide bisphenols such as 3,3-bis(4-hydroxyphenyl)-N-phenylphthalimide, and structural units derived from at least one biphenyl-bissulfone such as 4,4'-bis((4-chlorophenyl)sulfonyl)-1,1'-biphenyl. The novel polyethersulfone compositions may further comprise structural units derived from one or more biphenols such as 4,4'-biphenol, bisphenols such as BPA, or other electrophilic sulfone monomers, such as bis(4-chlorophenyl)sulfone. In one embodiment, the polyethersulfone composition of the present invention comprises structural groups derived exclusively from 3,3-bis(4-hydroxyphenyl)-N-phenylphthalimide, and 4,4'-bis((4-chlorophenyl)sulfonyl)-1,1'-biphenyl and exhibits a single glass transition of greater than 300° C.

24 Claims, No Drawings

HIGH HEAT POLYETHERSULFONE COMPOSITIONS

BACKGROUND

This invention relates to high heat polyethersulfone compositions, methods for their preparation, and articles made therefrom.

Polyethersulfones are a commercially important family of high performance, high temperature thermoplastics. These polymers are of interest to many industries because of their combination of high ductility, high heat resistance, hydrolysis resistance in steam and hot water environments and good overall chemical resistance. In addition, polyethersulfones are frequently transparent, unlike many non-transparent, semi-crystalline materials which are also used in high temperature applications.

Polyethersulfones can be produced by a variety of methods. For example, U.S. Pat. Nos. 4,108,837 and 4,175,175 describe the preparation of polyarylethers and in particular polyarylethersulfones. U.S. Pat. No. 6,228,970 describes the preparation polyarylethersulfones with improved polydispersity and reduced oligomer content. British patent GB 1,264,900 teaches a process for production of a polyethersulfone comprising structural units derived from 4,4'-biphenol, bisphenol-A, and bis (4-chlorophenyl)sulfone.

Currently available polyethersulfones typically possess an intermediate level of heat resistance. Commercially important polyarylethersulfones include polysulfone (PSU), polyphenylsulfone (PPSU) and polyethersulfone (PES). PSU is a well-known high temperature amorphous engineering thermoplastic resin exhibiting a glass transition temperature (Tg) of about 185° C., high strength, stiffness and toughness over a temperature range of from about −100° to 150° C. PSU has an Izod impact strength value (Notched Izod value) of about 69 $Jm^{-1}$ (1.3 ft-lb/in). PSU was commercially introduced in 1965 by the Union Carbide Corporation and is commercially available as UDEL® polysulfone from Solvay Advanced Polymers LLC. Another versatile polyarylethersulfone polymer is polyphenylsulfone (PPSU). PPSU is commercially available from Solvay Advanced Polymers LLC under the trademark of RADEL R®. It has a Tg of 220° C. and an Izod impact strength value of about 700 $Jm^{-1}$ (13 ft-lb/in).

In various applications it would be highly desirable to produce polyethersulfones with increased heat resistance (higher glass transition temperatures) relative to known polyethersulfones, while maintaining a useful level of impact strength.

BRIEF DESCRIPTION

In one embodiment, the present invention provides a polyethersulfone composition comprising structural units I

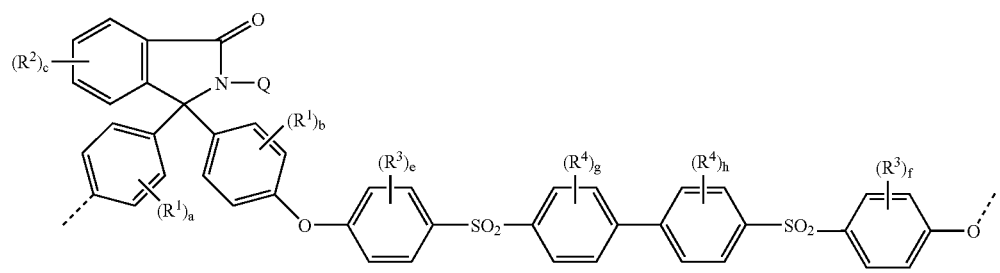

wherein Q is a $C_2$-$C_{50}$ aromatic radical; $R^1$, $R^2$, $R^3$, and $R^4$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "a", "b", "c", "e", "f", "g" and "h" are independently integers from 0 to 4.

In another embodiment, the present invention provides a polyethersulfone composition comprising structural units derived from at least one phthalimide bisphenol VI

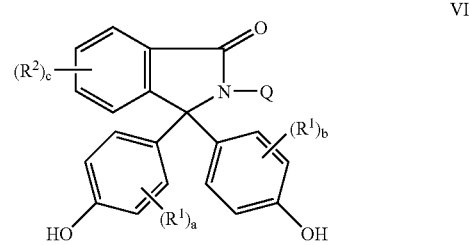

wherein Q is a $C_2$-$C_{50}$ aromatic radical; $R^1$ and $R^2$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "a", "b" and "c" are independently integers from 0 to 4;

at least one biphenyl-bissulfone VII

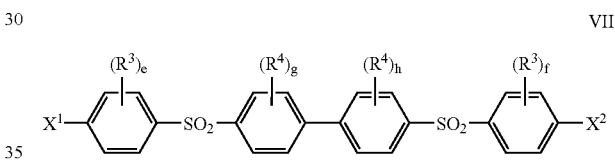

wherein $X^1$ and $X^2$ are independently halogen or nitro; $R^3$ and $R^4$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "e", "f", "g", and "h" are independently integers from 0 to 4; and optionally structural units derived from at least one biphenol VIII

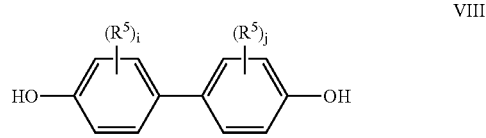

wherein $R^5$ is independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "i" and "j" are independently integers from 0 to 4.

In various aspects and embodiments, the invention may provide one or more molded articles comprising at least one polyethersulfone composition of the present invention. In various other embodiments, there is provided a method for making the polyethersulfone compositions of the present invention.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "PPPBP" is an acronym representing the phthalimide bisphenol 3,3-bis(4-hydroxyphenyl)-N-phenylphthalimide.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —OPhC(CF$_3$)$_2$PhO—), 4-chloromethylphen-1-yl, 3-trifluorovinyl-2-thienyl, 3-trichloromethylphen-1-yl (i.e., 3-CCl$_3$Ph-), 4-(3-bromoprop-1-yl)phen-1-yl (i.e., 4-BrCH$_2$CH$_2$CH$_2$Ph-), and the like. Further examples of aromatic radicals include 4-allyloxyphen-1-oxy, 4-aminophen-1-yl (i.e., 4-H$_2$NPh—), 3-aminocarbonylphen-1-yl (i.e., NH$_2$COPh-), 4-benzoylphen-1-yl, dicyanomethylidenebis(4-phen-1-yloxy) (i.e., —OPhC(CN)$_2$PhO—), 3-methylphen-1-yl, methylenebis(4-phen-1-yloxy) (i.e., —OPhCH$_2$PhO—), 2-ethylphen-1-yl, phenylethenyl, 3-formyl-2-thienyl, 2-hexyl-5-furanyl, hexamethylene-1,6-bis(4-phen-1-yloxy) (i.e., —OPh(CH$_2$)$_6$PhO—), 4-hydroxymethylphen-1-yl (i.e., 4-HOCH$_2$Ph-), 4-mercaptomethylphen-1-yl (i.e., 4-HSCH$_2$Ph—), 4-methylthiophen-1-yl (i.e., 4-CH$_3$SPh—), 3-methoxyphen-1-yl, 2-methoxycarbonylphen-1-yloxy (e.g., methyl salicyl), 2-nitromethylphen-1-yl (i.e., 2-NO$_2$CH$_2$Ph), 3-trimethylsilylphen-1-yl, 4-t-butyldimethylsilylphenl-1-yl, 4-vinylphen-1-yl, vinylidenebis(phenyl), and the like. The term "a $C_3$-$C_{10}$ aromatic radical" includes aromatic radicals containing at least three but no more than 10 carbon atoms. The aromatic radical 1-imidazolyl ($C_3H_2N_2$—) represents a $C_3$ aromatic radical. The benzyl radical ($C_7H_7$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is an cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylclooct-1-yl, 2-chlorodifluoromethylcyclohex-1-yl, hexafluoroisopropylidene-2,2-bis (cyclohex-4-yl) (i.e., —C$_6$H$_{10}$C(CF$_3$)$_2$C$_6$H$_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., CH$_3$CHBrCH$_2$C$_6$H$_{10}$O—), and the like. Further examples of cycloaliphatic radicals include 4-allyloxycyclohex-1-yl, 4-aminocyclohex-1-yl (i.e., H$_2$C$_6$H$_{10}$), 4-aminocarbonylcyclopent-1-yl (i.e., NH$_2$COC$_5$H$_8$—), 4-acetyloxycyclohex-1-yl, 2,2-dicyanoisopropylidenebis(cyclohex-4-yloxy) (i.e., —OC$_6$H$_{10}$C(CN)$_2$C$_6$H$_{10}$O—), 3-methylcyclohex-1-yl, methylenebis(cyclohex-4-yloxy) (i.e., —OC$_6$H$_{10}$CH$_2$C$_6$H$_{10}$O—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —OC$_6$H$_{10}$(CH$_2$)$_6$C$_6$H$_{10}$—), 4-hydroxymethylcyclohex-1-yl (i.e., 4-HOCH$_2$C$_6$H$_{10}$O—), 4-mercaptomethylcyclohex-1-yl (i.e., 4-HSCH$_2$C$_6$H$_{10}$O—), 4-methylthiocyclohex-1-yl (i.e., 4-CH$_3$SC$_6$H$_{10}$), 4-methoxycyclohex-1-yl, 2-methoxycarbonylcyclohex-1-yloxy (2-CH$_3$OCOC$_6$H$_{10}$O—), 4-nitromethylcyclohex-1-yl (i.e., NO$_2$CH$_2$C$_6$H$_{10}$O—), 3-trimethylsilylcyclohex-1-yl, 2-t-butyldimethylsilylcyclopent-1-yl, 4-trimethoxysilylethylcyclohex-1-yl (e.g., (CH$_3$O)$_3$SiCH$_2$CH$_2$C$_6$H$_{10}$—), 4-vinylcyclohexen-1-yl, vinylidenebis(cyclohexyl), and the like. The term "a C$_3$-C$_{10}$ cycloaliphatic radical" includes cycloaliphatic radicals containing at least three but no more than 10 carbon atoms. The cycloaliphatic radical 2-tetrahydrofuranyl (C$_4$H$_7$O—) represents a C$_4$ cycloaliphatic radical. The cyclohexylmethyl radical (C$_6$H$_{11}$CH$_2$—) represents a C$_7$ cycloaliphatic radical.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a C$_6$ aliphatic radical comprising a methyl group, the methyl group being a functional group which is an alkyl group. Similarly, the 4-nitrobut-1-yl group is a C$_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —CH$_2$CHBrCH$_2$—), and the like. Further examples of aliphatic radicals include allyl, aminocarbonyl (i.e., —CONH$_2$), carbonyl, 2,2-dicyanoisopropylidene (i.e., —CH$_2$C(CN)$_2$CH$_2$—), methyl (i.e., —CH$_3$), methylene (i.e., —CH$_2$—), ethyl, ethylene, formyl (i.e., —CHO), hexyl, hexamethylene, hydroxymethyl (i.e., —CH$_2$OH), mercaptomethyl (i.e., —CH$_2$SH), methylthio (i.e., —SCH$_3$), methylthiomethyl (i.e., —CH$_2$SCH$_3$), methoxy, methoxycarbonyl (i.e., CH$_3$OCO—), nitromethyl (i.e., —CH$_2$NO$_2$), thiocarbonyl, trimethylsilyl (i.e., (CH$_3$)$_3$Si—), t-butyldimethylsilyl, 3-trimethyoxysilylpropyl (i.e., (CH$_3$O)$_3$SiCH$_2$CH$_2$CH$_2$—), vinyl, vinylidene, and the like. By way of further example, a C$_1$-C$_{10}$ aliphatic radical contains at least one but no more than 10 carbon atoms. A methyl group (i.e., CH$_3$—) is an example of a C$_1$ aliphatic radical. A decyl group (i.e., CH$_3$(CH$_2$)$_9$—) is an example of a C$_{10}$ aliphatic radical.

As noted, the present invention provides a polyethersulfone composition comprising structural units I

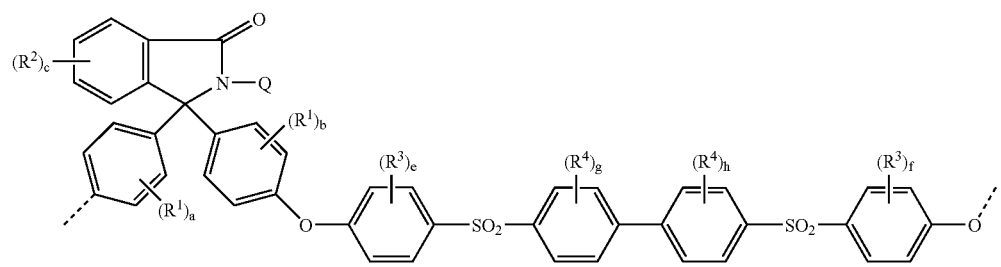

I wherein Q is a C$_2$-C$_{50}$ aromatic radical; R$^1$, R$^2$, R$^3$, and R$^4$ are independently at each occurrence halogen, nitro, a C$_1$-C$_{20}$ aliphatic radical, a C$_3$-C$_{20}$ cycloaliphatic radical, or a C$_2$-C$_{20}$ aromatic radical; and "a", "b", "c", "e", "f", "g" and "h" are independently integers from 0 to 4.

Structural units I present in the polyethersulfone compositions of the present invention are illustrated in Table 1 below wherein illustrative substitution patterns and definitions for Q, R$^1$, R$^2$, R$^3$, and R$^4$; and integers "a", "b", "c", "e", "f", "g" and "h" are given.

TABLE 1

Examples of Structural Units I

| Entry | Q | R$^1$ | R$^2$ | R$^3$ | R$^4$ | "a" | "b" | "c" | "d" | "e" | "f" | "g" | "h" |
|---|---|---|---|---|---|---|---|---|---|---|---|---|---|
| I-1 | ⌬ | — | — | — | — | 0 | 0 | 0 | 0 | 0 | 0 | 0 | 0 |

TABLE 1-continued

Examples of Structural Units I

| Entry | Q | $R^1$ | $R^2$ | $R^3$ | $R^4$ | "a" | "b" | "c" | "d" | "e" | "f" | "g" | "h" |
|---|---|---|---|---|---|---|---|---|---|---|---|---|---|
| I-2 | (3-methylbiphenyl) | 3-Me | — | — | — | 1 | 1 | 0 | 0 | 0 | 0 | 0 | 0 |
| I-3 | (4-CF3-phenyl) | — | — | 3-Cl | — | 0 | 0 | 0 | 0 | 1 | 1 | 0 | 0 |
| I-4 | (Cl, CF3-pyridyl) | — | 3-Me | — | 3-Cl | 0 | 0 | 1 |  | 0 | 0 | 1 | 1 |
| I-5 | (pyrazinyl) | — | — | — | — | 0 | 0 | 0 |  | 0 | 0 | 0 | 0 |
| I-6 | (thiazolyl) | — | — | — | — | 0 | 0 | 0 |  | 0 | 0 | 0 | 0 |
| I-7 | (3-CF3-thienyl) | — | — | — | — | 0 | 0 | 0 |  | 0 | 0 | 0 | 0 |
| I-8 | (benzothiazolyl) | — | — | — | — | 0 | 0 | 0 |  | 0 | 0 | 0 | 0 |

With respect to groups $R^1$-$R^4$, "—" indicates default substitution by hydrogen.

Polymer compositions comprising structural units I are referred to herein polyethersulfones, owing to the presence of both ether linkages (—O—), and sulfone (—SO$_2$—) linkages as features of the polymer structure. Structure I need not be regarded as the "repeat unit" of the polymer, but rather structure I may be regarded as a structural feature occurring at least once in the polymer. For example, a polymer composition might comprise a plurality of structural units I as part of the polymer chain and yet no two structural units I are adjacent to one another in the polymer chain (i.e. repeat). Alternatively, structure I may constitute essentially all of the internal structural units (all structural units apart from the end groups of the polymer chain) of the composition and as such represent the "repeat unit" of the polymer chain. In structure I, and throughout this disclosure, the dashed line (------) signals the point of attachment of one structural unit to an adjacent structural unit.

Polyethersulfone compositions comprising structural units I have been found to possess exceptionally high glass transition temperatures (Tg) making them suitable for use in high heat applications. In one embodiment, the present invention provides a polyethersulfone composition having a glass transition temperature of at least 300° C. In an alternate embodiment, the present invention provides a polyethersulfone composition having a glass transition temperature of at least 270° C. In yet another embodiment, the present invention provides a polyethersulfone composition having a glass transition temperature of at least 250° C.

In one embodiment, the polyethersulfone composition further comprises structural units II

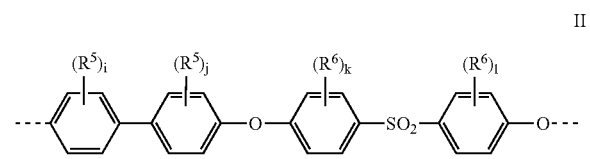

II wherein $R^5$ and $R^6$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "i", "j", "k", and "l" are independently integers from 0 to 4. As in the case of structural unit I, structural unit II need not be a "repeat" unit but may simply be a structural feature of the polyethersulfone composition. Alternatively, structural unit II may represent a repeat unit of the composition.

In yet another embodiment, the polyethersulfone composition of the present invention further comprises structural units III

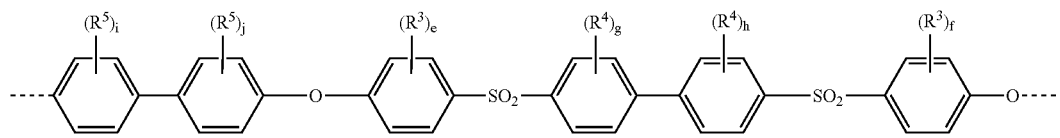

III wherein $R^3$, $R^4$, and $R^5$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "e", "f", "g", "h", "i", and "j" are independently integers from 0 to 4. As in the cases of structural groups I and II, structural group III may or may not represent a "repeat unit" of the composition.

In yet still another embodiment, the present invention provides a composition further comprising structural units IV

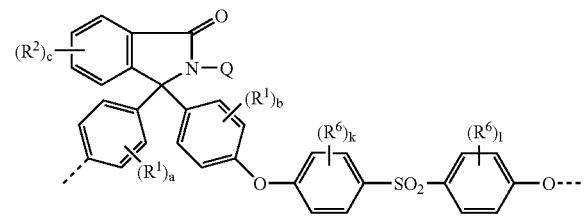

IV wherein Q is a $C_2$-$C_{50}$ aromatic radical; $R^1$, $R^2$, and $R^6$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "a", "b", "c", "k", and "l" are independently integers from 0 to 4. As in the cases of structural groups I, II, and III, structural group VI may or may not represent a "repeat unit" of the composition. It should be stressed that notwithstanding the presence of additional structural units (for example one or more of structural groups II, III and IV), each of the compositions of the present invention comprises at least one structural unit I.

In one embodiment, the present invention provides a polyethersulfone composition comprising structural units I which are "unsubstituted". This is the case when each of the variables "a", "b", "c", "e", "f", "g" and "h" is zero. This condition is illustrated in Table 1 by Entry I-1. As will be appreciated by those skilled in the art, all positions within a structural group capable of accommodating a substitutent group, default to substitution by hydrogen when a variable, for example the variable "e", is defined to be zero. In one embodiment, the present invention provides a polyethersulfone composition comprising structural units I and II wherein the variables "i", "j", "k", and "l" of structure II are each zero. In another embodiment, the present invention provides a polyethersulfone composition comprising structural units I and III wherein the variables "e", "f", "g", "h", "i", and "j" of structures I and III are each zero. In yet another embodiment, the present invention provides a polyethersulfone composition comprising structural units I and IV wherein the variables "a", "b", "c", "k", and "l" of structures I and IV are each zero.

In one embodiment, the polyethersulfone composition provided by the present invention further comprises structural units derived from at least one bisphenol having structure V

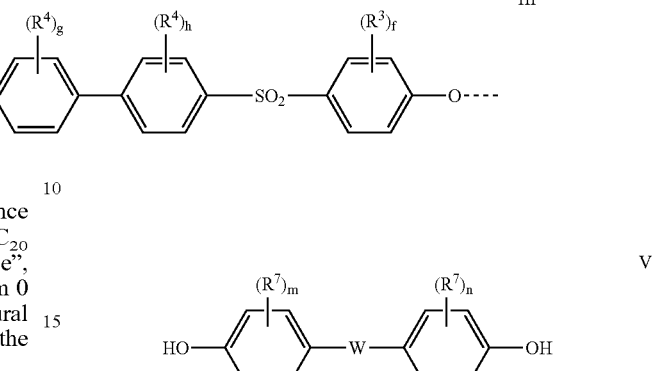

V wherein $R^7$ is independently at each occurrence halogen, nitro, a $C_1$-$C_{20}$ aliphatic radical, a $C_3$-$C_{20}$ cycloaliphatic radical, or a $C_2$-$C_{20}$ aromatic radical; W an oxygen atom, a sulfur atom, a selenium atom, a divalent $C_1$-$C_{20}$ aliphatic radical, a divalent $C_3$-$C_{20}$ cycloaliphatic radical, or a divalent $C_2$-$C_{20}$ aromatic radical; and "m", and "n" are independently integers from 0 to 4.

Bisphenols having structure V are illustrated by 1,1-bis (4-hydroxyphenyl)cyclopentane; 2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis(3-t-butyl-4-hydroxy-6-methylphenyl)butane; 2,2-bis(3-methyl-4-hydroxyphenyl) propane; 2,2-bis(4-hydroxyphenyl)-1,1,1,3,3,3-hexafluoropropane; 1,1-bis(4-hydroxyphenyl)-2,2,2-trichloroethane; 1,1-bis(4-hydroxyphenyl)norbornane; 1,2-bis(4-hydroxyphenyl)ethane; 1,3-bis(4-hydroxyphenyl) propenone; bis(4-hydroxyphenyl) sulfide; 4,4-bis(4-hydroxyphenyl)pentanoic acid; 4,4-bis(3,5-dimethyl-4-hydroxyphenyl)pentanoic acid; 2,2-bis(4-hydroxyphenyl) acetic acid; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (bisphenol-A); 1,1-bis(4-hydroxyphenyl)propane; 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl) propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy- 3-ethylphenyl)propane; 2,2-bis(4-hydroxy-3,5-dimethylphenyl)propane; 2,2-bis(3,5,3',5'-tetrachloro-4,4'-dihydroxyphenyl)propane; 1,1-bis(4-hydroxyphenyl)cyclohexylmethane; 2,2-bis(4-hydroxyphenyl)-1-phenylpropane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane; 1,1-bis(4-hydroxyphenyl)decane; 1,1-bis(4-hydroxyphenyl)cyclododecane; and 1,1-bis(3,5-dimethyl-4-hydroxyphenyl)cyclododecane.

In one embodiment, the present invention provides a polyethersulfone composition comprising structural units I, said polyethersulfone composition further comprising structural units derived from bisphenol A. In an alternate embodiment, the present invention provides a polyethersulfone composition comprising structural units I, II, and structural units derived from bisphenol A. In yet another embodiment, the present invention provides a polyethersulfone composition comprising structural units I, II, III, and structural units derived from bisphenol A. In yet still another embodiment, the present invention provides a polyethersulfone composition comprising structural units I, II, III, IV and structural units derived from bisphenol A.

Polyethersulfone compositions comprising structural units I may be prepared by reacting a phthalimide bisphenol such as 3,3-bis(4-hydroxyphenyl)-N-phenylphthalimide ("PPPBP") with a biphenyl-bissulfone such as 4,4'-bis((4-chlorophenyl)sulfonyl)-1,1'-biphenyl ("DCBPS") in a solvent at elevated temperature in the presence of a base and optionally a phase transfer catalyst. The product polyethersulfone compositions so prepared comprise structural units derived from the bisphenol and the biphenyl-bissulfone.

In one embodiment, a preformed salt of a phthalimide bisphenol (for example the sodium salt of PPPBA (PPPBANa$_2$) is reacted with 4,4'-bis((4-chlorophenyl)sulfonyl)-1,1'-biphenyl ("DCBPS") in orthodichlorobenzene ("oDCB") in the presence of a phase transfer catalyst which helps solubilize the preformed salt of the phthalimide bisphenol. The reaction temperature is such that the polymerization proceeds at a synthetically useful rate, typically at one or more temperatures in a range between about 100° C. and about 250° C. In one embodiment, the reaction temperature is in a range between about 145° C. and about 220° C. In another embodiment, the reaction temperature is in a range between about 165° C. and about 200° C. The solvent employed is typically a solvent which is relatively inert under the reaction conditions. Suitable solvents include chlorobenzene, diphenyl sulfone, diphenyl ether, oDCB, dichlorotoluenes, trichlorobenzene, xylenes, chloronaphthalene, sulfolane, N-methyl-2-pyrrolidone (NMP), dimethyl formamide (DMF), dimethylacetamide (DMAc), mixtures of two or more of the foregoing solvents, and the like. The preparation of salts such as PPPBPNa$_2$ is advantageously carried out at somewhat lower temperatures than have been employed in the past. Problems encountered in "spray-over" drying of a methanolic solution containing the PPPBPNa$_2$ into oDCB at 165° C. were overcome through the use of a lower boiling solvent and lower temperatures. Thus, when a methanolic solution of PPPBPNa$_2$ was added dropwise or sprayed into rapidly agitated chlorobenzene or toluene at lower temperature (e.g. 115° C.) in a drying vessel equipped with a distillation head and receiver, the isolated salt (PPPBPNa$_2$) gave acceptable results in subsequent polymerization reactions. Further enhancements of polymerization rates were attained through the use of higher catalyst loadings (4-10%), more active catalysts (e.g. hexapropylguanidinium chloride), mixed solvent systems, or combinations thereof were used (See Table 5 of the Experimental Section).

Suitable phase transfer catalysts include hexaalkylguanidinium salts, and bis-guanidinium salts. Typically, the phase transfer catalyst comprises an anionic species such as chloride, bromide, fluoride, mesylate, tosylate, tetrafluoroborate, acetate, and the like, as the charge-balancing counterion(s). Suitable guanidinium salts include those disclosed in U.S. Pat. Nos. 5,132,423; 5,116,975; and 5,081,298. Other suitable phase transfer catalysts include p-dialkylaminopyridinium salts, bis-dialkylaminopyridinium salts, bis-quaternary ammonium salts, bis-quaternary phosphonium salts, and phosphazenium salts. Suitable bis-quaternary ammonium and phosphonium salts are disclosed in U.S. Pat. No. 4,554,357. Suitable aminopyridinium salts are disclosed in U.S. Pat. Nos. 4,460,778; 4,513,141 and 4,681,949. Suitable phosphazenium salts include those disclosed in U.S. patent application Ser. No. 10/950,874 paragraphs 25, 26, 27, 28, 29, and 30 of which are incorporated herein by reference. Additionally, in certain embodiments, quaternary ammonium and phosphonium salts as disclosed in U.S. Pat. No. 4,273,712 are suitable for use in the preparation of the polyethersulfone compositions of the present invention.

When a polar aprotic solvent such as sulfolane is employed the use of the phase transfer catalyst may be optional. In one embodiment, the preformed salt of a phthalimide bisphenol and the preformed salt of at least one other bisphenol is employed.

An alternate method for preparing the polyethersulfone compositions of the present invention involves the in situ formation of the salt of the phthalimide bisphenol in the presence of a base. In some embodiments, the use of a polar solvent such as sulfolane, solubilizes the salt of the phthalimide bisphenol sufficiently for polymerization to be carried out in the absence of a phase transfer catalyst. In one embodiment, a phthalimide bisphenol and at least one additional bisphenol (for example 4, 4'-biphenyl) is employed.

In one embodiment, the polyethersulfone composition of the present invention comprises structural units derived from at least one phthalimide bisphenol VI

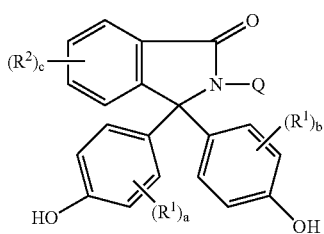

VI wherein Q is a $C_2$-$C_{50}$ aromatic radical; $R^1$ and $R^2$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "a", "b" and "c" are independently integers from 0 to 4;

at least one biphenyl-bissulfone VII

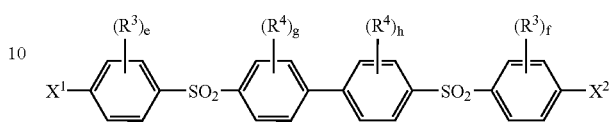

VII wherein $X^1$ and $X^2$ are independently halogen, or nitro; $R^3$ and $R^4$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "e", "f", "g", and "h" are independently integers from 0 to 4; and optionally structural units derived from at least one biphenol VIII

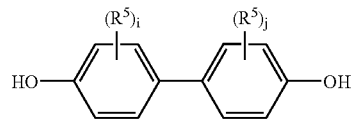

VIII wherein $R^5$ is independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "i" and "j" are independently integers from 0 to 4.

Suitable phthalimide bisphenols VI are illustrated by the bisphenols listed in Table 2, and the like.

TABLE 2

Illustrative Phthalimide bisphenols VI

| Entry | Q | $R^1$ | $R^2$ | "a" | "b" | "c" | Chemical Name |
|---|---|---|---|---|---|---|---|
| I-1 | phenyl | — | — | 0 | 0 | 0 | 3,3-bis(4-hydroxyphenyl)-N-phenylphthalimide |
| I-2 | biphenyl | 3-Me | — | 1 | 1 | 0 | 3,3-bis(4-hydroxy-3-methylphenyl)-N-biphenylphthalimide |
| I-3 | 4-CF$_3$-phenyl | — | — | 0 | 0 | 0 | 3,3-bis(4-hydroxyphenyl)-N-4-trifluoromethylphenyl-phthalimide |
| I-4 | 3-Cl-5-CF$_3$-2-pyridyl | — | 3-Me | 0 | 0 | 1 | 3,3-bis(4-hydroxyphenyl)-N-3-chloro-5-trifluoromethyl-2-pyridylphthalimide |

TABLE 2-continued

Illustrative Phthalimide bisphenols VI

| Entry | Q | $R^1$ | $R^2$ | "a" | "b" | "c" | Chemical Name |
|---|---|---|---|---|---|---|---|
| I-5 | pyrazinyl | — | — | 0 | 0 | 0 | 3,3-bis(4-hydroxyphenyl)-N-pyrazinylphthalimide |
| I-6 | 2-thiazolyl | — | — | 0 | 0 | 0 | 3,3-bis(4-hydroxyphenyl)-N-2-thiazolylphthalimide |
| I-7 | 3-CF₃-2-thienyl | — | — | 0 | 0 | 0 | 3,3-bis(4-hydroxyphenyl)-N-3-trifluoromethyl-2-thienylphthalimide |
| I-8 | 2-benzothiazolyl | — | — | 0 | 0 | 0 | 3,3-bis(4-hydroxyphenyl)-N-2-benzothiazolyl-phthalimide |

Suitable biphenyl-bissulfones VII are illustrated by the biphenyl-bissulfones listed in Table 3 and the like.

TABLE 3

Illustrative Biphenyl-Bissulfones VII

| Entry | $R^3$ | $R^4$ | "e" | "f" | "g" | "h" | $X^1$ | $X^2$ | Chemical name |
|---|---|---|---|---|---|---|---|---|---|
| VII-1 | — | — | 0 | 0 | 0 | 0 | Cl | Cl | 4,4'-bis((4-chlorophenyl)sulfonyl)-1,1'-biphenyl |
| VII-2 | — | — | 0 | 0 | 0 | 0 | F | F | 4,4'-bis((4-fluorophenyl)sulfonyl)-1,1'-biphenyl |
| VII-3 | 3-Cl | — | 1 | 1 | 0 | 0 | Cl | Cl | 4,4'-bis((3,4-dichlorophenyl)sulfonyl)-1,1'-biphenyl |
| VII-4 | 3-Cl, 3'-Cl | — | 0 | 0 | 1 | 1 | F | F | 4,4'-bis((4-fluorophenyl)sulfonyl)-3,3'-dichloro-1,1'-biphenyl |

Suitable biphenols VIII are illustrated by the biphenols listed in Table 4, and the like.

TABLE 4

Illustrative Biphenols VIII

| Entry | $R^5$ | "i" | "j" | Chemical name | Structure |
|---|---|---|---|---|---|
| VIII-1 | — | 0 | 0 | 4,4'-biphenol (also called 4,4'-dihydroxy-1,1'biphenyl) | HO—⟨4⟩—⟨4'⟩—OH |
| VIII-2 | 3-Me, 3'-Me | 1 | 1 | 3,-3'-dimethyl-4,4'-biphenol | Me at 3, 3'; HO at 4, 4' |
| VIII-3 | 3-Me | 1 | 0 | 3-methyl-4,4'-biphenol | Me at 3; HO at 4, 4' |

TABLE 4-continued

Illustrative Biphenols VIII

| Entry | $R^5$ | "i" | "j" | Chemical name | Structure |
|---|---|---|---|---|---|
| VIII-4 | 2-Ph | 1 | 0 | 2-phenyl-4,4'-biphenol | (see figure) |

In one embodiment, the present invention provides a polyethersulfone composition wherein the structural units derived from phthalimide bisphenol VI represent from about 10 mole percent to about 100 mole percent of all structural groups derived from a dihydroxy aromatic compound present in the composition. In another embodiment, the present invention provides a polyethersulfone composition wherein the structural units derived from phthalimide bisphenol VI represent from about 10 mole percent to about 50 mole percent of all structural groups derived from a dihydroxy aromatic compound present in the composition. In yet another embodiment, the present invention provides a polyethersulfone composition wherein the structural units derived from phthalimide bisphenol VI represent from about 10 mole percent to about 25 mole percent of all structural groups derived from a dihydroxy aromatic compound present in the composition.

In one embodiment, the polyethersulfone compositions of the present invention, structural units derived from biphenyl-bissulfone VII represent from about 10 to about 100 mole percent of all structural groups derived from an electrophilic sulfone monomer. In another embodiment, the polyethersulfone compositions of the present invention, structural units derived from biphenyl-bissulfone VII represent from about 10 to about 70 mole percent of all structural groups derived from an electrophilic sulfone monomer. In yet another embodiment, the polyethersulfone compositions of the present invention, structural units derived from biphenyl-bissulfone VII represent from about 10 to about 50 mole percent of all structural groups derived from an electrophilic sulfone monomer. Those skilled in the art will appreciate that electrophilic sulfone monomers are sulfone monomers capable of undergoing a nucleophilic displacement reaction with the salt of an aromatic hydroxy compound. Electrophilic sulfone monomers are illustrated by 4,4'-bis((4-chlorophenyl)sulfonyl)-1,1'-biphenyl (See Entry VII-1 Table 3) and bis(4-chlorophenyl)sulfone. Those skilled in the art will appreciate that 4,4'-bis((4-chlorophenyl)sulfonyl)-1,1'-biphenyl and bis(4-chlorophenyl)sulfone are capable of undergoing a nucleophilic displacement reaction with the salt of an aromatic hydroxy compound, for example the disodium salt of bisphenol A. It is stressed that all of the biphenyl-bissulfones listed in Table 3 represent electrophilic sulfone monomers.

As noted, the presence of structural units derived from biphenol VIII is optional and thus, in one embodiment, the structural units derived from biphenol VIII represent from about 0 mole percent to about 90 mole percent of all structural groups derived from a dihydroxy aromatic compound present in the composition. In another embodiment, the structural units derived from biphenol VIII represent from about 5 mole percent to about 70 mole percent of all structural groups derived from a dihydroxy aromatic compound present in the composition. In yet another embodiment, the structural units derived from biphenol VIII represent from about 5 mole percent to about 50 mole percent of all structural groups derived from a dihydroxy aromatic compound present in the composition.

In one embodiment, the polyethersulfone compositions of the present invention further comprise structural units derived from at least one sulfone IX

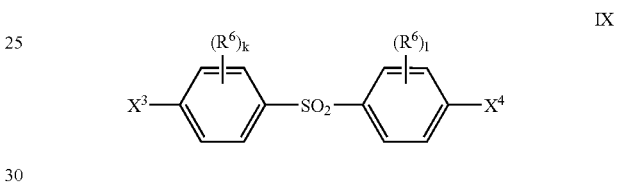

IX wherein $X^3$ and $X^4$ are independently halogen, or nitro; $R^6$ is independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "k" and "l" are independently integers from 0 to 4.

Suitable sulfones IX are illustrated by bis(4-chlorophenyl)sulfone (DCDPS), bis(3,4-dichlorophenyl)sulfone, bis(3,4,5-trichlorophenyl)sulfone, bis(4-fluorophenyl)sulfone, bis(3,4-difluorophenyl)sulfone, bis(4-nitrophenyl)sulfone, bis(4-chloro-3-nitrophenyl)sulfone, and the like.

In one embodiment, the present invention provides a polyethersulfone composition in which structural units derived from sulfone IX represent from about 5 to about 90 mole percent of all structural groups derived from an electrophilic sulfone monomer. In another embodiment, the present invention provides a polyethersulfone composition in which structural units derived from sulfone IX represent from about 5 to about 50 mole percent of all structural groups derived from an electrophilic sulfone monomer. In yet another embodiment, the present invention provides a polyethersulfone composition in which structural units' derived from sulfone IX represent from about 5 to about 25 mole percent of all structural groups derived from an electrophilic sulfone monomer. In one embodiment, the present invention provides a polyethersulfone composition comprising structural units derived from biphenyl-bissulfone VII and sulfone IX, wherein the structural units derived from biphenyl-bissulfone VII represent from about 20 mole percent to about 95 mole percent of all structural groups derived from an electrophilic sulfone monomer. In another embodiment, the present invention provides a polyethersulfone composition comprising structural units derived from biphenyl-bissulfone VII and sulfone IX, wherein the structural units derived from sulfone IX represent from about 5 mole percent to about 70 mole percent of all structural groups derived from an electrophilic sulfone monomer.

In one embodiment, the present invention provides a polyethersulfone composition comprising structural groups derived from 3,3-bis(4-hydroxyphenyl)-N-phenylphthalimide and 4,4'-bis((4-chlorophenyl)sulfonyl)-1,1'-biphenyl. In another embodiment, the present invention provides a polyethersulfone composition comprising structural groups derived from 3,3-bis(4-hydroxyphenyl)-N-phenylphthalimide; 4,4'-bis((4-chlorophenyl)sulfonyl)-1,1'-biphenyl; and bis(4-chlorophenyl)sulfone. In yet another embodiment the present invention provides a polyethersulfone composition comprising structural groups derived from 3,3-bis(4-hydroxyphenyl)-N-phenylphthalimide; 4,4'-bis((4-chlorophenyl)sulfonyl)-1,1'-biphenyl; bis(4-chlorophenyl)sulfone and 4,4'-biphenol.

Standard additives may be added to the polyethersulfone compositions of the present invention to the invention, preferably in quantities of from about 0.00001 to about 80% by weight and more preferably in quantities of from about 0 to about 60% by weight, based on the weight of the composition. These additives include such materials as thermal stabilizers, antioxidants, UV stabilizers, plasticizers, visual effect enhancers, extenders, antistatic agents, catalyst quenchers, mold releasing agents, fire retardants, blowing agents, impact modifiers and processing aids. The different additives that can be incorporated into the polyethersulfone compositions of the present invention are typically commonly used in resin compounding and are known to those skilled in the art.

Visual effect enhancers which may be included in the polyethersulfone composition, sometimes known as visual effects additives or pigments may be present in an encapsulated form, a non-encapsulated form, or laminated to a particle comprising polymeric resin. Some non-limiting examples of visual effects additives are aluminum, gold, silver, copper, nickel, titanium, stainless steel, nickel sulfide, cobalt sulfide, manganese sulfide, metal oxides, white mica, black mica, pearl mica, synthetic mica, mica coated with titanium dioxide, metal-coated glass flakes, and colorants, including but not limited, to Perylene Red. The visual effect additive may have a high or low aspect ratio and may comprise greater than 1 facet. Dyes may be employed such as Solvent Blue 35, Solvent Blue 36, Disperse Violet 26, Solvent Green 3, Anaplast Orange LFP, Perylene Red, and Morplas Red 36. Fluorescent dyes may also be employed including, but not limited to, Permanent Pink R (Color Index Pigment Red 181, from Clariant Corporation), Hostasol Red 5B (Color Index #73300, CAS # 522-75-8, from Clariant Corporation) and Macrolex Fluorescent Yellow 10GN (Color Index Solvent Yellow 160:1, from Bayer Corporation). Pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed. Visual effect additives in encapsulated form usually comprise a visual effect material such as a high aspect ratio material like aluminum flakes encapsulated by a polymer. The encapsulated visual effect additive has the shape of a bead.

Non-limiting examples of antioxidants which may be included in the polyethersulfone composition include tris(2,4-di-tert-butylphenyl)phosphite; 3,9-di(2,4-di-tert-butylphenoxy)-2,4,8,10-tetraoxa-3,9-diphosphaspiro(5.5)undecane; 3,9-di(2,4-dicumylphenoxy)-2,4,8,10-tetraoxa-3,9-diphosphaspiro(5.5)undecane; tris(p-nonylphenyl)phosphite; 2,2',2"-nitrilo(triethyl-tris(3,3',5,5'-tetra-tertbutyl-1,1'-biphenyl-2'-diyl)phosphite); 3,9-distearyloxy-2,4,8,10-tetraoxa-3,9-diphosphaspiro(5.5)undecane; dilauryl phosphite; 3,9-di(2,6-di-tert-butyl-4-methylphenoxy)-2,4,8,10-tetraoxa-3,9-diphosphaspiro(5.5)undecane; tetrakis(2,4-di-tert-butylphenyl)-4,4'-bis(diphenylene)phosphonite; distearyl pentaerythritol diphosphite; diisodecyl pentaerythritol diphosphite; 2,4,6-tri-tert-butylphenyl-2-butyl-2-ethyl-1,3-propanediol phosphite; tristearyl sorbitol triphosphite; tetrakis(2,4-di-tert-butylphenyl)-4,4'-*biphenylene* diphosphonite; (2,4,6-tri-tert-butylphenyl)-2-butyl-2-ethyl-1,3-propanediolphosphite; triisodecylphosphite; and mixtures of phosphites containing at least one of the foregoing. Tris(2,4-di-tert-butylphenyl) phosphite; 2,4,6-tri-tert-butylphenyl-2-butyl-2-ethyl-1,3-propanediol phosphite; bis(2,4-di-tert-butylphenyl)pentaerythritol diphosphite are especially preferred, as well as mixtures of phosphites containing at least one of the foregoing phosphites, and the like.

The polyethersulfone compositions of the present invention may optionally comprise an impact modifier. The impact modifier resin may be added to the polyethersulfone in an amount corresponding to about 1% to about 30% by weight, based on the total weight of the composition. Suitable impact modifiers include those comprising one of several different rubbery modifiers such as graft or core shell rubbers or combinations of two or more of these modifiers. Impact modifiers are illustrated by acrylic rubber, ASA rubber, diene rubber, organosiloxane rubber, ethylene propylene diene monomer (EPDM) rubber, styrene-butadiene-styrene (SBS) rubber, styrene-ethylene-butadiene-styrene (SEBS) rubber, acrylonitrile-butadiene-styrene (ABS) rubber, methacrylate-butadiene-styrene (MBS) rubber, styrene acrylonitrile copolymer and glycidyl ester impact modifier.

Non-limiting examples of processing aids which may be included in the polyethersulfone composition include, Doverlube® FL-599 (available from Dover Chemical Corporation), Polyoxyter® (available from Polychem Alloy Inc.), Glycolube P (available from Lonza Chemical Company), pentaerythritol tetrastearate, Metablen A-3000 (available from Mitsubishi Rayon), neopentyl glycol dibenzoate, and the like.

Non-limiting examples of UV stabilizers which may be included in the polyethersulfone composition include 2-(2'-Hydroxyphenyl)-benzotriazoles, e.g., the 5'-methyl-; 3',5'-di-tert.-butyl-; 5'-tert.-butyl-; 5'-(1,1,3,3-tetramethylbutyl)-; 5-chloro-3',5'-di-tert.-butyl-; 5-chloro-3'-tert.-butyl-5'-methyl-; 3'-sec.-butyl-5'-tert.-butyl-; 3'-alpha-methylbenzyl-5'-methyl; 3'-alpha-methylbenzyl-5'-methyl-5-chloro-; 4'-hydroxy-; 4'-methoxy-; 4'-octoxy-; 3',5'-di-tert.-amyl-; 3'-methyl-5'-carbomethoxyethyl-; 5-chloro-3',5'-di-tert.-amyl-derivatives; and Tinuvin® 234 (available from Ciba Specialty Chemicals). Also suitable are the 2,4-bis-(2'-hydroxyphenyl)-6-alkyl-s-triazines, e.g., the 6-ethyl-; 6-heptadecyl- or 6-undecyl-derivatives. 2-Hydroxybenzophenones e.g., the 4-hydroxy-; 4-methoxy-; 4-octoxy-; 4-decyloxy-; 4-dodecyloxy-; 4-benzyloxy-; 4,2',4'-trihydroxy-; 2,2',4,4'-tetrahydroxy- or 2'-hydroxy-4,4'-dimethoxy-derivative. 1,3-bis-(2'-Hydroxybenzoyl)-benzenes, e.g., 1,3-bis-(2'-hydroxy-4'-hexyloxy-benzoyl)-benzene; 1,3-bis-(2'-hydroxy-4'-octyloxy-benzoyl)-benzene or 1,3-bis-(2'-hydroxy-4'-dodecyloxybenzoyl)-benzene may also be employed. Esters of optionally substituted benzoic acids, e.g., phenylsalicylate; octylphenylsalicylate; dibenzoylresorcin; bis-(4-tert.-butylbenzoyl)-resorcin; benzoylresotcin; 3,5-di-tert.-butyl-4-hydroxybenzoic acid-2,4-di-tert.-butylphenyl ester or -octadecyl ester or -2-methyl-4,6-di-tert.-butyl ester may likewise be employed. Acrylates, e.g., alpha -cyano-beta, beta-diphenylacrylic acid-ethyl ester or isooctyl ester, alpha-carbomethoxy-cinnamic acid methyl ester, alpha-cyanobeta-methyl-p-methoxy-cinnamic acid methyl ester or -butyl ester or N-(beta-carbomethoxyvinyl)-2-methyl-indoline may likewise be employed. Oxalic acid diamides, e.g., 4,4'-di-octyloxy-oxanilide; 2,2'-di-octyloxy-5,5'-di-tert.-butyl-oxanilide; 2,2'-di-dodecyloxy-5,5-di-tert.-butyl-oxanilide; 2-ethoxy-2'-ethyl-oxanilide; N,N'-bis-(3-dimethyl-aminopropyl)-oxalamide; 2-ethoxy-5-tert.-butyl-2'-ethyloxanilide and the mixture thereof with 2-ethoxy-2'-ethyl-5,4'-di-tert.-butyl-oxanilide; or mixtures of ortho- and para-methoxy—as well as of o- and p-ethoxy-disubstituted oxanilides are also suitable as UV stabilizers. Preferably the ultraviolet light absorber used in the instant compositions is 2-(2-hydroxy-5-methylphenyl)-2H-benzotriazole; 2-(2-hydroxy-3,5-di-tert-amylphenyl)-2H-benzotriazole; 2-(2-hydroxy-3,5-di-(alpha,alpha-dimethylbenzyl)phenyl)-2H-benzotriazole; 2-(2-hydroxy-5-tert-octylphenyl)-2H-benzotriazole; 2-hydroxy-4-octyloxybenzophenone; nickel bis(O-ethyl 3,5-di-tert-butyl-4-hydroxybenzylphosphonate); 2,4-dihydroxybenzophenone; 2-(2-hydroxy-3-tert-butyl-5-methylphenyl)-2H-benzotriazole; nickel butylamine complex with 2,2'-thiobis(4-tert-butylphenol); 2-ethoxy-2'-ethyloxanilide; 2-ethoxy-2'-ethyl-5,5'-ditert-butyloxanilide or a mixture thereof.

Non-limiting examples of fire retardants which may be included in the polyethersulfone composition include potassium nonafluorobutylsulfonate, potassium diphenylsulfone sulfonate, and phosphite esters of polyhydric phenols, such as resorcinol and bisphenol A.

Non-limiting examples of mold release compositions which may be included in the polyethersulfone composition include esters of long-chain aliphatic acids and alcohols such as pentaerythritol, guerbet alcohols, long-chain ketones, siloxanes, alpha.-olefin polymers, long-chain alkanes and hydrocarbons having 15 to 600 carbon atoms.

The polyethersulfone compositions according to the invention may also be mixed in known manner with other known polymers to form for example, polymer blends, polymer mixtures, and polymer alloys.

Articles comprising a polyethersulfone composition of the present invention are another embodiment of the present invention. In one embodiment, the article is a molded article. In another embodiment, the article is an extruded film. In another embodiment, the article comprises a polyethersulfone composition of the present invention as a solvent cast film. In yet another embodiment, the article comprises a polyethersulfone composition of the present invention as a spin coated film. In various embodiments articles may comprise the polyethersulfone composition, for example in admixture with additives known in the art, such as conventional UV screeners, for use for example in applications such as injection molding, thermoforming, in-mold decoration, and like applications.

In other embodiments articles of the present invention are multilayer articles comprising two or more layers, typically in contiguous superposed contact with one another. In various embodiments multilayer articles comprise a substrate layer comprising the polyethersulfone composition of the present invention. In alternative embodiments the article comprises a substrate comprising at least one thermoplastic polymer, thermoset polymer, cellulosic material, glass, ceramic, or metal, and at least one coating layer thereon, said coating layer comprising a polyethersulfone composition provided by the present invention. Optionally, the multilayer articles may further comprise an interlayer, for example an adhesive interlayer (or tie layer), between any substrate layer and any coating layer. Multilayer articles of the invention include, but are not limited to, those which comprise a substrate layer and a coating layer comprising a polyethersulfone composition provided by present invention; those which comprise a substrate layer comprising said polyethersulfone composition and a coating layer comprising a resorcinol polyarylate material. In another embodiment, the article comprises at least two layers comprising the polyethersulfone composition of the present invention. Any interlayer may be transparent and/or may contain an additive, for example a colorant or decorative material such as metal flake.

Representative articles which can be made comprising the polyethersulfone compositions of the invention include aircraft, automotive, truck, military vehicle (including automotive, aircraft, and water-borne vehicles), and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

EXAMPLES

The following examples are intended only to illustrate methods and embodiments in accordance with the invention, and as such should not be construed as imposing limitations upon the claims. Unless specified otherwise, all ingredients are commercially available. The acronym, "PPPBP", stands for 3,3-bis(4-hydroxyphenyl)-N-phenylphthalimide (CAS Reg. No. 6607-41-6). The acronym, "DCBPS", stands for 4,4'-bis((4-chlorophenyl)sulfonyl)-1,1'-biphenyl. The acronym, "DCDPS", stands for bis(4-chlorophenyl)sulfone (DCDPS). The acronym, "PPPBPNa$_2$", stands for the disodium salt of PPPBP. The acronym, "BPNa$_2$" stands for the disodium salt of 4,4'-biphenol. The disodium salt of 4,4'-biphenol was prepared and isolated by known methods. The disodium salt of 3,3-bis(4-hydroxyphenyl)-N-phenylphthalimide (PPPBPNa$_2$) was prepared as described herein. The acronym HEGCI stands for hexaethylguanidium chloride. The solvent, diphenyl ether, is abbreviated Ph$_2$O.

Example 1 Synthesis of PPPBP-BP/DCBPS Copolymer Comprising 50 Mole % PPPBP and 50 Mole % BP PPPBPNa$_2$ Synthesis PPPBP (30.1584 g, 0.07667 mol) was suspended in methanol (600 mL) under a blanket of nitrogen. NaOH (aqueous 50.58% w/w, 12.1302 g, 0.15339 mol) dissolved in MeOH (200 mL) was added via addition funnel. The resulting pale yellow solution was pumped into a distillation vessel equipped with a nitrogen inlet, mechanical stirrer and short-path distillation apparatus containing hot (115° C.), stirred chlorobenzene (500 mL). The addition of the methanol solution to the hot chlorobenzene was carried out at a rate of about 8 mL/min. with concommitant distillation of methanol/water from the vessel. Upon completion of the distillation of the methanol/water, the temperature was slowly raised to 145° C. The water content of the distillate was monitored by Karl Fischer titration until it was found to be 30 ppm, at which point the disodium salt of PPPBP (PPPBPNa$_2$) was judged to be sufficiently dry for use in a subsequent polymerization reaction. The resulting PPPBPNa$_2$ was filtered under nitrogen and used for polymerizations.

Polymerization

Method Using Phase-Transfer Catalysis:

PPPBPNa$_2$ (5.060 g, 0.01157 moles), BPNa$_2$ (2.902 g, 0.01283 moles) and 100 mL oDCB were combined in a nitrogen purged 250 mL 3-neck flask equipped with a nitrogen inlet, mechanical stirrer and short path distillation apparatus. The salts were further dried by distillation of oDCB until Karl Fischer titration indicated that the distillate contained less than 20 ppm water. To the suspension of the dry salts in oDCB under a positive flow of nitrogen was added DCBPS (11.67 g, 0.02318 moles) and 100 mL of oDCB. The mixture was dried by distillation of oDCB until the solids content was 25-30% and until the water content of the distillate was less than 20 ppm as determined by Karl Fischer titration. The temperature was raised to 180° C., and hexapropylguanadinium chloride (NPr$_6$GCl, 2.2 mL, 23.1% solution in oDCB, 0.00183 moles) was added via syringe. After the catalyst was added, the reaction mixture gradually turned brown. Within 45 minutes, gel permeation chromatography showed that the product copolymer had a weight average molecular weight (Mw) of 59,000 grams per mole. The polydispersity index (PDI=$M_w/M_n$) was determined to be 3.1. At this stage, the product copolymer had begun to precipitate from solution. The product copolymer was isolated by cooling the reaction mixture to ambient temperature and decanting the oDCB-rich supernatant liquid. The copolymer was then dissolved in sulfolane (100 mL), and the resultant solution was precipitated into rapidly agitated methanol (500 mL) in a blender to afford a light tan precipitate which was filtered and washed with 500 mL methanol, then dried in the vacuum oven. The product copolymer displayed a single glass transition temperature ($T_g$) of 282° C.

Method Using A Dipolar Aprotic Solvent:

PPPBP (10.0309 g, 0.025550 moles), DCBPS (12.8555 g, 0.02553 moles), potassium carbonate (3.9800 g, 0.02880 moles) and 50 mL of sulfolane were combined in a 250 mL 3-neck flask equipped with mechanical stirrer, thermocouple and short path distillation apparatus. Under a flow of nitrogen, 100 mL toluene was added. The toluene was distilled until the water content of the distillate was determined to be 80 ppm by Karl Fischer analysis. The reaction was heated at 200° C. for 6 hours until Mw=59,000, PDI=2.53 was reached.

At 100° C., 100 mL of oDCB was added. The solution was hot filtered. The polymer was isolated by precipitation of 100 mL-portions of polymer solution into 500 mL of rapidly stirred methanol. The product was filtered and dried in a vacuum oven. The Tg of the resulting polymer was 303° C.

Examples 1, 2, 3 and 5 were carried out following the method using phase-transfer catalysis. Example 4 was carried out using the method using a dipolar aprotic solvent. Results are gathered in Table 5.

TABLE 5

Polyethersulfone Copolymer Compositions

| Example | BP/ PPPBP | Molar Ratio of DCDPS/ DCBPS | Solvent | Catalyst/ base | Rxn Temp. (° C.) | Mw (g/mol) | $T_g$ (° C.) |
| --- | --- | --- | --- | --- | --- | --- | --- |
| 1 | 50/50 | 0/100 | oDCB | NPr$_6$GCl (7%) | 200 | 59k (0.75h) | 282 |
| 2 | 50/50 | 0/100 | oDCB | HEGCl (8%) | 180 | 44k (0.5h) | — |
| 3 | 50/50 | 0/100 | oDCB/Ph$_2$O 6/1 | NPr$_6$GCl (7.5%) | 180 | 49k (0.5h) | — |
| 4 | 0/100 | 0/100 | sulfolane | K$_2$CO$_3$ | 200 | 59k (6h) | 303 |
| 5 | 50/50 | 50/50 | ODCB/sulfolane 9/1 | HEGCl (8%) | 180 | 46k | — |

Among the product copolymers listed in Table 5 for which glass transition temperature data was gathered (Example 1), only one Tg was observed indicating random character of the copolymer. The highest glass transition temperature was observed for the product of Example 4 which comprised only structural units derived from PPPBP and DCBPS.

The foregoing examples are merely illustrative, serving to illustrate various aspects of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. A polyethersulfone composition comprising structural units I

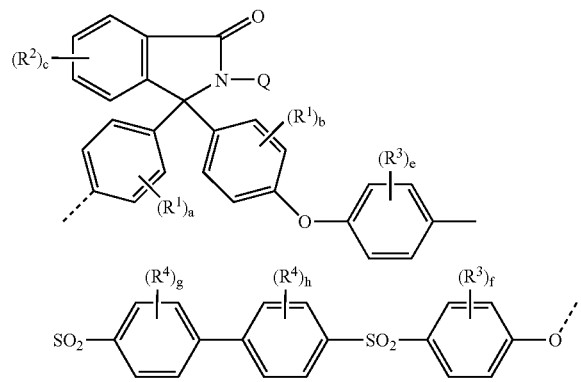

wherein Q is a $C_2$-$C_{50}$ aromatic radical; $R^1$, $R^2$, $R^3$, and $R^4$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "a", "b", "c", "e", "f", "g" and "h" are independently integers from 0 to 4.

2. The polyethersulfone composition according to claim 1, said composition having a glass transition temperature of at least 270° C.

3. The polyethersulfone composition according to claim 1, said composition having a glass transition temperature of at least 250° C.

4. The polyethersulfone composition according to claim 1, further comprising structural units II

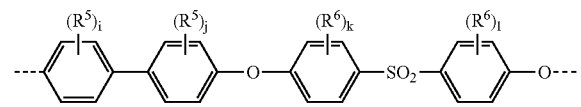

wherein $R^5$ and $R^6$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "i", "j", "k", and "l" are independently integers from 0 to 4.

5. The polyethersulfone composition according to claim 1, further comprising structural units III

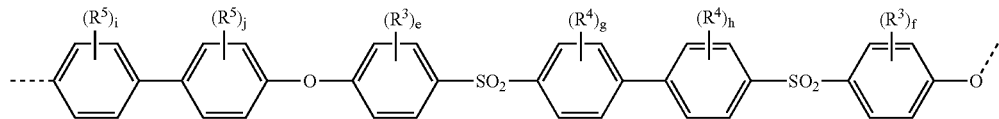

wherein $R^3$, $R^4$, and $R^5$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "e", "f", "g", "h", "i", and "j" are independently integers from 0 to 4.

6. The polyethersulfone composition according to claim 1, further comprising structural units IV

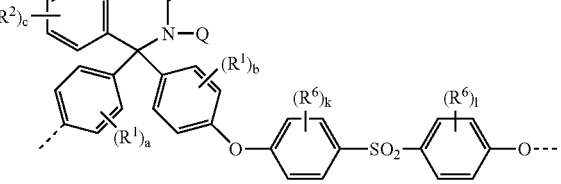

wherein Q is a $C_2$-$C_{50}$ aromatic radical; $R^1$, $R^2$, and $R^6$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "a", "b", "c", "k", and "l" are independently integers from 0 to 4.

7. The polyethersulfone composition according to claim 1, wherein "a", "b", "c", "e", "f", "g" and "h" are each zero.

8. The polyethersulfone composition according to claim 4, wherein "i", "j", "k", and "l" are each zero.

9. The polyethersulfone composition according to claim 5, wherein "e", "f", "g", "h", "i", and "j" are each zero.

10. The polyethersulfone composition according to claim 6, wherein "a", "b", "c", "k", and "l" are each zero.

11. The polyethersulfone composition according to claim 1, further comprising strutural units derived from at least one bisphenol V

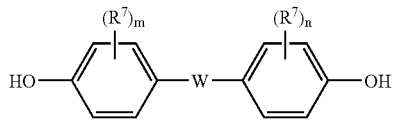

V wherein $R^7$ is independently at each occurrence halogen, nitro, a $C_1$-$C_{20}$ aliphatic radical, a $C_3$-$C_{20}$ cycloaliphatic radical, or a $C_2$-$C_{20}$ aromatic radical; W an oxygen atom, a sulfur atom, a selenium atom, a divalent $C_1$-$C_{20}$ aliphatic radical, a divalent $C_3$-$C_{20}$ cycloaliphatic radical, or a divalent $C_2$-$C_{20}$ aromatic radical; and "m", and "n" are independently integers from 0 to 4.

12. The polyethersulfone composition according to claim 1, further comprising structural units derived from bisphenol A.

13. A polyethersulfone composition comprising structural units derived from at least one phthalimide bisphenol VI

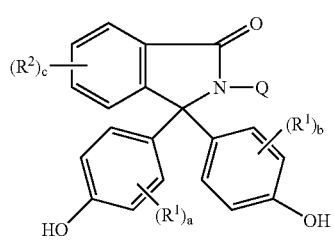

VI wherein Q is a $C_2$-$C_{50}$ aromatic radical; $R^1$ and $R^2$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "a", "b" and "c" are independently integers from 0 to 4;

at least one biphenyl-bissulfone VII

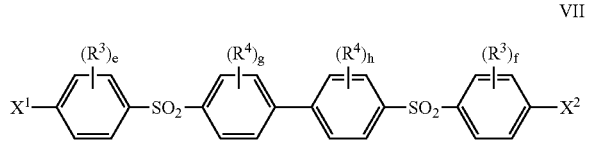

VII wherein $X^1$ and $X^2$ are independently halogen, or nitro; $R^3$ and $R^4$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "e", "f", "g", and "h" are independently integers from 0 to 4; and optionally structural units derived from at least one biphenol VIII

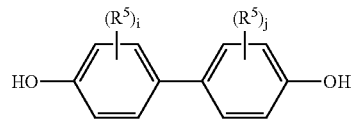

VIII wherein $R^5$ is independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "i" and "j" are independently integers from 0 to 4.

14. The polyether sulfone composition according to claim 13, wherein the structural units derived from phthalimide bisphenol VI represent from about 10 mole percent to about 100 mole percent of all structural groups derived from a dihydroxy aromatic compound present in the composition.

15. The polyether sulfone composition according to claim 13, wherein the structural units derived from biphenol VIII represent from about 0 mole percent to about 90 mole percent of all structural groups derived from a dihydroxy aromatic compound present in the composition.

16. The polyethersulfone composition according to claim 13, further comprising structural units derived from at least one sulfone IX

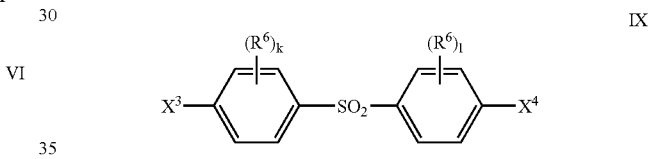

IX wherein $X^3$ and $X^4$ are independently halogen, or nitro; $R^6$ is independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "k" and "l" are independently integers from 0 to 4.

17. The polyethersulfone composition according to claim 16, wherein the structural units derived from biphenyl-bissulfone VII represent from about 10 mole percent to about 70 mole percent of all structural groups derived from an electrophilic sulfone monomer.

18. The polyethersulfone composition according to claim 16, wherein the structural units derived from sulfone IX represent from about 5 mole percent to about 50 mole percent of all structural groups derived from an electrophilic sulfone monomer.

19. A polyethersulfone composition comprising structural groups derived from 3,3-bis(4-hydroxyphenyl)-N-phenylphthalimide; and 4,4'-bis((4-chlorophenyl)sulfonyl)-1,1'-biphenyl.

20. The polyethersulfone composition according to claim 19, further comprising of structural groups derived from bis(4-chlorophenyl)sulfone.

21. The polyethersulfone composition according to claim 19, further comprising of structural groups derived from 4,4'-biphenol.

22. An article comprising the polyethersulfone composition of claim 1.

23. A method of making a polyethersulfone composition; said method comprising:

(a) heating a reaction mixture comprising at least one solvent, at least one organic phase transfer catalyst, at least one dialkali metal salt of a phthalimide bisphenol VI

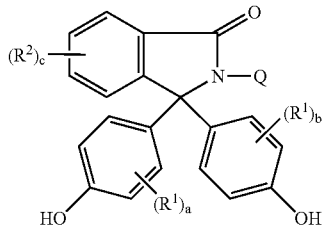

wherein Q is a $C_2$-$C_5$(aromatic radical; $R^1$ and $R^2$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "a", "b", "c", and "d" are independently integers from 0 to 4;

and at least one biphenyl-bissulfone VII

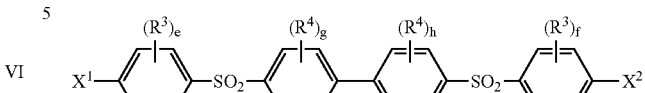

wherein $X^1$ and $X^2$ are independently halogen, or nitro; $R^3$ and $R^4$ are independently at each occurrence halogen, nitro, a $C_1$-$C_{20}$ aliphatic radical, a $C_3$-$C_{20}$ cycloaliphatic radical, or a $C_2$-$C_{20}$ aromatic radical; and "e", "f", "g", and "h" are independently integers from 0 to 4 to provide a reaction product; and (b) recovering a product polyethersulfone.

24. A polyethersulfone composition consisting essentially of structural groups derived from 3,3-bis(4-hydroxyphenyl)-N-phenylphthalimide; and 4,4'-bis((4-chlorophenyl)sulfonyl)-1,1'-biphenyl.

* * * * *